US005738944A

United States Patent [19]

Fromson et al.

[11] Patent Number: 5,738,944
[45] Date of Patent: Apr. 14, 1998

[54] LITHOGRAPHIC PRINTING PLATE TREATED WITH ORGANO-PHOSPHONIC ACID CHELATING COMPOUNDS AND PROCESSES RELATED THRERETO

[75] Inventors: Howard A. Fromson, 49 Main St., Stonington, Conn. 06378; Robert F. Gracia, Woodstock Valley, Conn.; Sean P. Evans, South Windsor, Conn.; William J. Rozell, Vernon, Conn.

[73] Assignee: Howard A. Fromson, Stonington, Conn.

[21] Appl. No.: 780,737

[22] Filed: Jan. 8, 1997

Related U.S. Application Data

[60] Division of Ser. No. 652,402, May 23, 1996, which is a continuation-in-part of Ser. No. 577,043, Dec. 22, 1995, abandoned, which is a continuation-in-part of Ser. No. 454,608, May 31, 1995, abandoned.

[51] Int. Cl.$^6$ .......... B32B 9/00

[52] U.S. Cl. .......... 428/409; 428/425.8; 428/433; 428/448; 428/450; 428/481; 430/166; 430/272; 430/278; 430/302; 204/27; 204/33; 204/38.3; 101/459

[58] Field of Search .......... 428/195, 448, 428/469, 433, 451, 425.8, 450; 204/27, 33, 38.3, 85; 101/459; 430/272, 278, 279, 302, 166

[56] References Cited

U.S. PATENT DOCUMENTS

| | | |
|---|---|---|
| 3,122,417 | 2/1964 | Blaser et al. . |
| 3,149,151 | 9/1964 | Schiefer et al. . |
| 3,214,454 | 10/1965 | Blaser et al. . |
| 3,220,832 | 11/1965 | Uhlig . |
| 3,234,124 | 2/1966 | Irani . |
| 3,234,140 | 2/1966 | Irani . |
| 3,309,990 | 3/1967 | Klüpfel et al. . |
| 3,317,340 | 5/1967 | Ziehr et al. . |
| 3,336,221 | 8/1967 | Ralston . |
| 3,380,924 | 4/1968 | Werdelmann et al. . |
| 3,396,020 | 8/1968 | Borchers et al. . |
| 3,438,778 | 4/1969 | Uhlig et al. . |
| 3,468,725 | 9/1969 | Uhlig et al. . |
| 3,475,293 | 10/1969 | Haynes . |
| 3,706,634 | 12/1972 | Kowalski . |
| 3,706,635 | 12/1972 | Kowalski . |
| 3,900,370 | 8/1975 | Germscheid et al. . |
| 3,928,147 | 12/1975 | Kowalski . |
| 3,958,994 | 5/1976 | Burnett . |
| 4,153,461 | 5/1979 | Berghäuser et al. . |
| 4,399,021 | 8/1983 | Gillich et al. . |
| 4,626,328 | 12/1986 | Mohr .......... 204/129.95 |
| 4,689,272 | 8/1987 | Simon et al. . |
| 5,254,430 | 10/1993 | Nayashima et al. .......... 430/166 |

FOREIGN PATENT DOCUMENTS

| | | |
|---|---|---|
| 1237899 | 3/1962 | Germany . |
| 1621478 | 12/1967 | Germany . |
| 4317507 | 7/1943 | Japan . |
| 263668 | 5/1964 | Netherlands . |
| 164804 | 12/1968 | Netherlands . |
| 135840 | 11/1972 | Netherlands . |
| 471879 | 8/1961 | Switzerland . |
| 1019919 | 2/1963 | United Kingdom . |
| 1056914 | 6/1964 | United Kingdom . |
| 1084072 | 2/1965 | United Kingdom . |

*Primary Examiner*—Patrick Ryan
*Assistant Examiner*—Abraham Bahta
*Attorney, Agent, or Firm*—Felfe & Lynch

[57] ABSTRACT

The water-loving properties of an anodized aluminum lithographic surface are enhanced or restored by treatment with a solution containing a monomeric, organo-phosphonic acid chelating compound or salt thereof. Such treatment can take place following, during or in lieu of the treatment of anodized aluminum in web form with an alkali metal silicate in the process of manufacturing printing plates. Alternatively, the treatment can be carried out as a plate is developed and/or prepared for the press. In a third approach, an organo-phosphonic acid chelating compound can be incorporated into a fountain solution, ink or correction fluid.

21 Claims, No Drawings

LITHOGRAPHIC PRINTING PLATE TREATED WITH ORGANO-PHOSPHONIC ACID CHELATING COMPOUNDS AND PROCESSES RELATED THRERETO

RELATED APPLICATION

This is a Divisional Application of application Ser. No. 08/652,402, filed May 23, 1996 now pending; which is a continuation-in-part of application Ser. No. 08/577,043 filed Dec. 22, 1995 (abandoned) which is a continuation-in-part of application Ser. No. 08/454,608 filed May 31, 1995 (abandoned).

This invention relates to lithographic printing plates and lithographic printing, and more particularly to a process for creating, enhancing, or restoring the hydrophilicity or water-loving character of lithographic printing plates.

BACKGROUND

Aluminum lithographic printing plates are well known and widely used. Such plates are disclosed in Fromson U.S. Pat. No. 3,181,461. Aluminum is grained and anodized to form an anodic oxide surface which is then rendered water-loving by post-treating it with an alkali metal silicate such as sodium silicate. Thereafter a hydrophobic/organophilic, ink-loving image is formed on the plate photographically or by direct imaging techniques. The plate with an organophilic image and a hydrophilic background or non-image area, can be mounted on an offset press for printing newspapers and the like. Ink and an aqueous fountain solution are applied to the plate. A nearly instantaneous separation takes place on the plate with ink adhering to the image and the fountain solution wetting the background of the plate. The ink image is then transferred to the surface to be printed via an offset roll. Today, many years after expiration of the Fromson '461 patent, the anodized and silicated aluminum plate remains the plate of choice for lithographic printing.

To ensure that clear, sharp printing will result over long press runs, steps have been taken to enhance the water-loving character of the background of the plate. For example, a second post-treatment employing a solution of polyvinyl phosphonic acid (PVPA) is disclosed in U.S. Pat. No. 4,689,272. The use of PVPA for this purpose, however, suffers from several drawbacks. Unless PVPA is maintained at a temperature of about 140° F., stability problems are encountered. If the temperature drops to room temperature (about 70° F.), PVPA precipitates and forms cobweb-like filaments. These filaments can clog application nozzles and/or wind up on the printing plate itself with deleterious effects. PVPA is also relatively expensive and is not available on a commodity basis.

Another problem resulting in substantial paper waste occurs during start-up of web-fed newspaper presses used by large-circulation daily newspapers. When a web-fed press begins to print, newsprint is run through the press, and water, as part of an aqueous fountain solution, and ink are applied to the printing plates. Because time is required to achieve the correct ink and water balance, many waste copies of a newspaper are printed before saleable product is produced. Wastage also results when excess water causes a web break and the start-up process has to be repeated.

SUMMARY

The present invention provides an improved anodized aluminum printing plate and an improved process for enhancing or restoring the hydrophilicity of an anodized aluminum lithographic surface while overcoming the difficulties heretofore encountered with other post treatments. The invention also improves the quality of printing by reducing water requirements on press and thus leads to less waste and fewer web breaks.

In the present invention, water and ink, or an emulsion containing ink and water or glycols, are applied to an anodized aluminum lithographic printing plate with an oleophilic image and a hydrophilic background. The plate is preferably silicated according to U.S. Pat. No. 3,181,461. The water attracting properties of the background are enhanced by treating at least the background with a monomeric, organo-phosophonic acid cheating compound or salt thereof.

Such treatment can take place prior to, following, during, or in lieu of, the treatment of anodized aluminum with sodium silicate in the process of manufacturing printing plates. Alternatively, the treatment can be carried out as the plate is developed and prepared for press. In a third approach, the treatment can be carried out during lithographic printing itself by incorporating an organo-phosphonic acid chelating compound into the ink or the aqueous fountain solution.

Monomeric organo-phosphonic acid chelating compounds and their salts can also be used as correction fluids to restore the water-loving character to that portion or area of a plate which has lost its hydrophilicity.

DESCRIPTION

In the present invention, anodized aluminum printing plates are treated with one or more organo-phosphonic acid chelating compounds or the salts thereof. Suitable acids are stable at room temperature and are monomeric, water soluble, multifunctional organo-phosphonic acids that are classified as chelating agents. Such acids can contain an amino or one or more $C_{1\ to\ 6}$ alkyl amino groups and at least two organo-phosphonic acid chelating groups, preferably at least two methane organo-phosphonic acid chelating compound groups bound to a nitrogen atom. These organo-phosphonic acid chelating compounds have been found to be effective hydrophilizing agents for treating printing plates according to the invention under acid, neutral or alkaline conditions.

Examples of suitable organo-phosphonic acid chelating compounds and salts are aminotri- (methylenephosphonic acid) (ATMPA) and its pentasodium salt ($Na_5$ATMPA); hydroxyethylidene (diphosphonic acid) (HEDP) and its tetrasodium salt, ($Na_4$HEDP); hexamethylenediaminetetra (methylenephosphonic acid) (HDTMP) and its hexapotassium salt, ($K_6$HDTMP); and diethylenetriaminepenta (methylenephosphonic acid) (DTPMP) and its hexasodium salt, $Na_6$DTPMP.

Compositions or solutions containing one or more organo-phosphonic acid chelating compounds or salts are stable at room temperature and can be used: (i) to post-treat anodized aluminum in web form; (ii) to develop an imaged plate; (iii) to finish a developed plate; (iv) in offset printing inks and/or a fountain solutions and (v) to treat scratched plates to restore hydrophilicity to the background.

In a preferred embodiment, an aluminum web is grained to increase its surface area using known mechanical, chemical or electrochemical techniques. A preferred technique employs unfused alumina to brush grain aluminum according to U.S. Pat. No. 4,183,788 to Fromson. The web is then anodized to form a layer of aluminum oxide on the grained surface. A preferred method for continuously anodizing a moving web is disclosed in U.S. Pat. No. Re 29,754 to Fromson. The anodized web is then post-treated with an alkali metal silicate, such as sodium silicate, by itself or in combination with 0.1% to about 5.0% by weight, preferably about 0.2% to about 3%, of an organo-phosphonic acid chelating compound as described herein. Alternatively, the web can be treated after the silicate treatment with an aqueous solution containing from about 0.1% to about 5.0%, preferably about 0.2% to about 3.0%, of an organo-phosphonic acid chelating compound as disclosed herein.

ATMPA is preferred as is the use of deionized water for the solution. ATMPA is especially preferred for treating anodized aluminum, preferably as a second treatment following treatment with sodium silicate.

ATMPA has the formula:

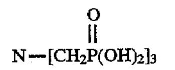

ATMPA is available from Monsanto Chemical Company, St. Louis, Mo., under the trademark DEQUEST® 2000. See U.S. Pat. Nos. 3,234,124; 3,234,140; 3,336,221 which are incorporated herein by reference especially with respect to other species related to any species disclosed herein.

The pentasodium salt of ATMPA, sold under the trademark DEQUEST® 2006, may also be used according to the present invention.

HEDP, has the formula:

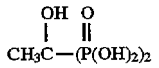

HEDP is sold under the trademark DEQUEST 2010. Its tetrasodium salt is sold under the trademark DEQUEST 2016 and it may be used in the present invention. See U.S. Pat. Nos. 3,122,417; 3,149,151; 3,214,454; 3,317,340; 3,380,924; 3,475,293; 3,706,634; 3,706,635; and 3,928,147 which are incorporated herein by reference especially with respect to other species related to any species disclosed herein.

HDTMP is sold under the trademark DEQUEST 2054 as the hexapotassium salt. Either HDTMP or its potassium salt may be used in the present invention.

HDTMP has the formula:

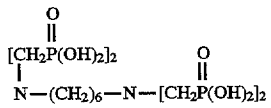

DTPMP is sold under the trademark DEQUEST 2060 in the free acid form and as DEQUEST 2066 in the hexasodium salt form.

DTPMP has the following formula:

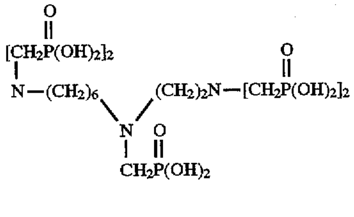

An anodized and silicated web or offset plate is treated by immersion for from about 0.5 second to about two minutes preferably for about 5 to about 10 seconds, in the chelating agent solution at a temperature of about 120° to 212° F., preferably about 150° to 200° F. and most preferably from about 180° to 210° F. Alternatively, the post-treatment may be carried out electrochemically, as is well known in the art.

Monomeric organo-phosphonic acid chelating compounds used in the present invention have a cost which is only one percent (1%) of that of PVPA and present no stability or storage problems. Unlike PVPA, solutions of monomeric organo-phosphonic acid chelating compounds described herein are stable at room temperature and can be used without fear of precipitation.

To enhance the hydrophilic nature of the background, an imaged plate may be developed using conventional developers additionally containing from about 0.1% to about 5% (preferably about 0.5% to about 2.0%) by weight of an organo-phosphonic acid chelating compound as described herein. Alternatively or additionally, after development, a plate may be treated with an aqueous solution containing from about 0.1% to about 5%, preferably about 0.5% to about 2.0% of an organo-phosphonic acid chelating compound. This is sometimes referred to as finishing the plate. Suitable finishing compositions are provided in Example 1 below.

After developing and finishing, a plate is mounted on an offset press where it comes into contact with ink and an aqueous fountain solution. Fountain solutions may be acidic, neutral or alkaline and each can incorporate a monomeric organo-phosphonic acid chelating compound as described herein.

An ink or fountain solution may contain about 0.1% to about 5.0%, preferably about 0.5% to about 2% of an organo-phosphonic acid chelating compound and can be used with any anodized aluminum plates.

Lithographic printing can be carried out with a mono-fluid comprising a pigmented oleophilic phase and an hydrophilic phase such as glycol or water or combination thereof. Such fluids can contain from about 0.1% to about 5.0%, preferably about 0.5% to about 2.0% of an organo-phosphonic acid chelating compound as described herein to enhance the hydrophilic properties of lithographic printing plates and reduce ink consumption.

Mono or single fluid lithography prints emulsion inks without the need for a separate dampening system and is described by Chou et al in TAGA 1995 Proceedings, pp 121–167 which is incorporated herein by reference.

After making a plate, it is sometimes necessary to remove portions of the image. This is done with a correction fluid which removes the underlying oxide thus exposing bare aluminum metal.

Unwanted ink pick-up in these exposed areas can be avoided by applying a solution containing one or more of the monomeric organo-phosphonic acid chelating compounds disclosed herein to the portion of the plate which has been exposed after removal of the image.

A correction fluid can contain about 0.1% to about 5% of an organo-phosphonic acid compound, preferably about 0.5% to about 2.0%.

To insure, long-run, clean-printing, ideally anodized and silicated aluminum in web form is treated with an organo-phosphonic acid chelating compound and the resulting plate is treated at every later stage with compositions containing organo-phosphonic acid chelating compounds, that is, development, finishing, printing and repair.

The invention will be further illustrated by reference to the following example which are intended to illustrate the invention without limiting same.

EXAMPLE 1

The following plate finishing formulations were tested:

1) Control No. 1 Anocoil Subtractive S Finisher containing no organo-phosphonic acid chelating compound made by Anocoil Corp., Rockville, Conn.

2) Control No. 2 a commercial Subtractive finisher XLS made by Anitec Corp., Holyoke, Mass.

3) Finisher #445 with the following composition

| | |
|---|---|
| Deionized Water | 86.10% |
| Amiogum 30 Starch (a dextrin thickener) | 10.00% |
| Macol 21 (a non-ionic surfactant) | 2.00% |
| Glycerin | 0.50% |
| Borax | 0.40% |
| 50% ATMPA solution | 1.00% |
| | 100.00% |

4) Finisher #446 with the following composition:

| | |
|---|---|
| Deionized Water | 91.86% |
| Lithogum IRX (gum arabic) | 4.00% |
| Macol 21 (a non-ionic surfactant) | 2.24% |
| Glycerin | 0.50% |
| Borax | 0.40% |
| 50% ATMPA solution | 1.00% |
| | 100.00% |

Four negative working photopolymer printing plates made of anodized and silicated aluminum, AnoCoil WW19 plates, were exposed and developed. Each of the above finishers were applied to a printing plate after development which were mounted on an offset printing press which was run under normal conditions.

The number of waste copies printed before the first acceptable clean copy was printed were counted and recorded. The results are listed below:

| | Number of Waste Copies |
|---|---|
| 1) Control No. 1 | 40 copies |
| 2) Control No. 2 | 85 copies |
| 3) Finisher #445 | 35 copies |
| 4) Finisher #446 | 30 copies |

The results show that the use of an organo-phosphonic acid chelating compound as described herein in a finishing formulation reduces the number of waste copies made on start-up of an offset press indicting that the water-loving character of the background of each plate was enhanced by the application of an organo-phosphonic acid chelating compound according to the invention. The waste savings translate into lower costs for the printer.

EXAMPLE 2

Seven finishing formulations similar to Finisher #446 of Example 1 were prepared using ATMPA, $Na_5$ATMPA, HEDP, $Na_4$HEDP, $K_6$HDTMP, DTPMP and $Na_6$DTPMP. Plates were exposed, developed, treated with each finisher, rinsed and dried as in Example 1. All seven finished were compared to Control No. 1 used in Example 1. Press ink was applied to each plate rinsed with water and dried. The dried plate was rubbed with press ink. All seven samples treated with the monomeric organo-phosphonic acid chelating compounds or salts exhibited better ink repelling characteristics than the control finisher having no monomeric organo-phosphonic acid chelating compound derivatives. The salts of the acids also gave better results.

EXAMPLE 3

An offset printing plate as used in Example 1 was scratched several times in the background with a knife edge. The plate was then treated with a correction fluid containing 0.5% by weight $Na_6$DTPMP, washed and dried. Press ink was rubbed into the scratch and rinsed with water. Ink was immediately washed out of the scratched area, indicating that the disruption of hydrophilicity caused by the scratches was restored.

EXAMPLE 4

An offset printing plate as used in Example 1 was placed on an offset printing press and scratched in the background. Upon printing the scratch picked up ink which was printed. The scratched plate was then treated with the following formulation:

| Finisher #437 | |
|---|---|
| Deionized Water | 46.67% |
| 50% ATMPA solution | 0.95% |
| 3N NaOH | 4.76% |
| MACOL 21 (a non-ionic surfactant) | 47.62% |
| | 100.00% |

When the press resumed printing, the scratch disappeared from the printed sheet and did not appear after 100 copies. The scratched area of the plate was washed with warm water and 250 more copies were run with no scratches appearing.

EXAMPLE 5

A fountain solution having the following composition:

| | % by Wt. |
|---|---|
| Deionized water | 33.35 |
| Gum Arabic | 2.13 |
| 50% Solution of ATMPA | 17.92 |
| 10% Solution of NaOH | 30.72 |
| 85% Solution of $H_3PO_4$ | 1.15 |
| Magnesium Nitrate | 0.43 |
| Myacide AS Plus | 1.25 |
| Triton X100 Surfactant | 0.21 |
| Dowanol PM | 12.81 |
| | 100.00 |

at a concentration of approximately 0.23% was prepared at a conductivity of 800–900 μS/cm and a pH of 4.5. This solution was placed in the sump of a Goss Urbanite Newspaper Press and pumped into the water train of the press. Forty thousand papers were produced over a period of two hours. During that period, the amount of water needed to run a clean sheet was 25% less than was experienced using a conventional alkaline fountain solution supplied by New England Newspaper Supply under the name "Liquid Gold" at a concentration of 1.5 oz/gal and a conductivity of 1200–1500 μS/cm. Printing with less water is very advantageous because it reduces ink consumption. This results in significant cost savings, better printing latitude, and a cleaner, sharper printed image.

EXAMPLE 6

Example 5 was repeated, except that HEDP was used in place of ATMPA in the fountain solution at a pH of 8.5. Similar results were observed.

EXAMPLE 7

Anocoil anodized and silicated WW19 presensitized plates made by Anocoil Corporation of Rockville, Conn. 06066 following the teachings of Fromson Patents U.S. Pat. No. 3,181,461, U.S. Pat. No. 4,183,788 and U.S. Pat. No. Re 29,754 were also post-treated in web form with an aqueous solution of 0.5% by weight ATMPA at a temperature of 180° F. for 10 seconds.

ATMPA treated WW19 plates were tested with standard Anocoil WW19 plates at a newspaper using the following equipment and materials:

Press Type: MAN Roland Unimen

Units: #8

Dampening system: Spiral Brush

Foundation Solution Type: Nensco Liquid Gold—Ackaline #215

Ink Type:
U.S. ink—Standard Black
Standard Color

Blanket Type:
Black Units—Sun Graphics 0365 High Buff
Color Units—Nensco Version #20 (Tan)

Paper Type: Bowater

Plate Processor: Anocoil XPH-36 Subtractive

Developer Type: Anocoil Type "S"

Finisher Type: Anocoil standard WW finisher

Treated and standard plates were used to print short runs of 2000 to 4000 impressions. The start-up for each run, measured by the number of copies that have to be discarded before clean, saleable copies are produced, was shorter using treated plates. In some cases, start-up wastage was reduced by as much as 40% as compared to standard plates.

EXAMPLE 8

ATMPA treated plates of Example 7 were used with the same materials and equipment of Example 7 to print a daily paper of 32,000 impressions. During run water (fountain solution) and ink settings were gradually reduced as follows:

| | Water | Ink |
|---|---|---|
| Press Start - Normal Setting | 45% | 70% |
| | 40% | 68% |
| | 35% | 66% |
| | 30% | 64% |
| | 28% | 63% |
| | 25% | 61% |
| | 20% | 60% |
| | 15% | 58% |
| | 10% | 57% |
| End of Run | 5% | 55% |

The paper continued to print without background tone during the reduction down to a 5% water setting and a 55% ink setting. During the course of the test, ink density and reproductive quality, especially in the color pictures, improved as water and ink were reduced. At the 5% water setting, plates on the press were very dry in appearance but were printing very clean.

EXAMPLE 9

Printing plates were made as in Example 7 except that anodized aluminum plates were treated with an aqueous solution containing 3% by weight sodium silicate (Star Brand by Philadelphia Quartz) and 0.5% by weight ATMPA at 200° F. for 12 seconds. The plates were rinsed and dried and press inks were rubbed onto selected areas of the treated plate surface. The plates were sprayed with water and rubbed with a wet swab. The press ink was completely removed indicating a high degree of hydrophilicity of the treated surface which was capable of rejecting oleophilic ink.

EXAMPLE 10

Example 9 is repeated using the penta-sodium salt of ATMPA in place of ATMPA with similar results.

What is claimed:

1. In a lithographic printing process wherein water or a hydrophilic compound and oleophilic ink are applied to an anodized aluminum lithographic printing plate having an oleophilic image and a hydrophilic background, the improvement for enhancing the hydrophilicity of the background which consists essentially of treating at lest the background with a monomeric, organo-phosphonic acid chelating compound containing at least three methane organo-phosphonic acid groups bound to a nitrogen atom of salt thereof.

2. Process for making an anodized aluminum lithographic printing surface which consists essentially of treating the anodized surface with a monomeric, organo-phosphonic acid chelating compound containing at least three methane organo-phosphonic acid groups bound to a nitrogen atom or salt thereof.

3. Process of claim 1 wherein the anodized aluminum surface is treated first with an alkali metal silicate and then with said chelating compound.

4. Process of claim 1 wherein the anodized aluminum surface is treated simultaneously with an alkali metal silicate and said chelating compound.

5. Process of claim 2 wherein the chelating compound is selected from a group of ATMPA, HDTMP, and DTPMP, and salts thereof.

6. Process of claim 2 wherein the chelating compound is ATMPA or a salt thereof.

7. In a process for making an aluminum lithographic printing plate wherein anodized aluminum is provided with an oleophilic image and a hydrophilic background, the improvement for rendering the background water-loving which consists essentially of treating the background with a monomeric, organo-phosphonic acid chelating compound containing at least three methane organo-phosphonic acid groups bound to a nitrogen atom or salt thereof.

8. Process of claim 7 wherein the chelating compound is selected from the group of ATMPA, HEDP, HDTMP, and DTPMP, and salts thereof.

9. Process of claim 7 wherein the chelating compound is ATMPA or salt thereof.

10. Process of claim 1 wherein the alkali metal silicate is sodium silicate.

11. In a lithographic printing process wherein oleophilic ink and an aqueous fountain solution are applied to the surface of an anodized aluminum printing plate provided with an oleophilic image and hydrophilic background, the improvement for enhancing the hydrophilicity of the background which consists essentially of incorporating a monomeric, organo-phosphonic acid chelating compound containing at least three methane organo-phosphonic acid groups bound to a nitrogen atom or a salt thereof into the ink and/or the fountain solution.

12. Process of claim 11 wherein the chelating compound is selected from the group of ATMPA, HEDP, HDTMP, and DTPMP, and salts thereof.

13. Process of claim 11 wherein the chelating compound is ATMPA or a salt thereof.

14. Process of claim 1 wherein the alkali metal silicate is sodium silicate.

15. In a process for making an anodized aluminum lithographic printing plate having a hydrophilic surface, a portion of which is subsequently removed exposing the underlying plate surface, the improvement for restoring hydrophilicity to said exposed underlying plate surface which consists essentially of treating said exposed surface with a monomeric, organo-phosphonic acid chelating compound containing at least three methane organo-phosphonic acid groups bound to a nitrogen atom or a salt thereof.

16. Process of claim 15 wherein the chelating compound is selected from the group of ATMPA, HEDP, HDTMP, and DTPMP, and salts thereof.

17. Process of claim 15 wherein the chelating compound is ATMPA or a salt thereof.

18. Process for making an anodized aluminum lithographic printing surface which consists essentially of treating the anodized surface with an alkali metal silicate and a monomeric, organo-phosphonic acid chelating compound containing at lest three methane organo-phosphonic acid groups bound to a nitrogen atom or salt thereof.

19. In a process for making an anodized aluminum lithographic printing plate having an oleophilic image and a hydrophilic background, the improvement for rendering the background water-loving which consists essentially of treating the background with an alkali metal silicate and a monomeric, organo-phosphonic acid chelating compound or salt thereof.

20. In a lithographic printing process wherein oleophilic ink and an aqueous foundation solution are applied to the surface of an anodized aluminum printing plate which is treated with an alkali metal silicate and provided with an oleophilic image and hydrophilic background, the improvement for enhancing the hydrophilicity of the background which consists essentially of incorporating a monomeric, organo-phosphonic acid chelating compound containing at least three methane organo-phosphonic acid groups bound to a nitrogen atom or a salt thereof into the ink and/or the foundation solution.

21. In a process for making an anodized aluminum lithographic printing plate which is treated with an alkali metal silicate to provide a hydrophilic surface, a portion of which is subsequently removed exposing the underlying plate surface, the improvement for restoring hydrophilicity to said exposed underlying plate surface which consists essentially of treating said exposed surface with a monomeric, organo-phosphonic acid chelating compound containing at least three methane organo-phosphonic acid groups bound to a nitrogen atom or a salt thereof.

* * * * *

UNITED STATES PATENT AND TRADEMARK OFFICE
CERTIFICATE OF CORRECTION

PATENT NO. : 5,738,944 Page 1 of 2

DATED : April 4, 1998

INVENTOR(S) : Howard A. Fromson et al

It is certified that error appears in the above-identified patent and that said Letters Patent is hereby corrected as shown below:

On the title page: Item [54]and Col. 1, line 4, change "THRERETO" to --THERETO--.

Item [56]

On the cover, in the section titled References Cited, U.S. Patent Documents, last line, change "Nayashima" to -- Nagashima --.

In column 2, line 13, change "phosophonic" to -- phosphonic --.

In column 2, line 13, change "cheating" to -- chelating --.

In column 3, in the last chemical formula, line 61, change "N - $(CH_2)_6$" to -- N-$(CH_2)_2$ --.

In column 5, line 48, change "indicting" to -- indicating --.

In column 7, line 23, change "0365" to -- #365 --.

UNITED STATES PATENT AND TRADEMARK OFFICE

CERTIFICATE OF CORRECTION

PATENT NO. : 5,738,944

DATED : April 14, 1998

INVENTOR(S) : Howard A. FROMSON et al.

It is certified that error appears in the above-identified patent and that said Letters Patent is hereby corrected as shown below:

In Claim 1, column 8, line 18, change "lest" to -- least --.

In Claim 1, column 8, line 21, change "of" to -- or --.

Signed and Sealed this

Fourth Day of January, 2000

Attest:

Attesting Officer

Acting Commissioner of Patents and Trademarks